(12) United States Patent
Sakamoto

(10) Patent No.: US 8,780,453 B2
(45) Date of Patent: Jul. 15, 2014

(54) ZOOM LENS AND IMAGE PICKUP APPARATUS HAVING THE SAME

(75) Inventor: Masaru Sakamoto, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 336 days.

(21) Appl. No.: 13/404,141

(22) Filed: Feb. 24, 2012

(65) Prior Publication Data

US 2012/0224270 A1    Sep. 6, 2012

(30) Foreign Application Priority Data

Mar. 2, 2011 (JP) ................................. 2011-044832

(51) Int. Cl.
*G02B 15/14* (2006.01)

(52) U.S. Cl.
USPC .......................................... 359/688; 359/683

(58) Field of Classification Search
USPC ........................................................ 359/688
See application file for complete search history.

(56) References Cited

U.S. PATENT DOCUMENTS

| 7,982,971 B2* | 7/2011 | Nakamura | 359/688 |
| 2004/0042075 A1* | 3/2004 | Yoshimi et al. | 359/380 |
| 2010/0123957 A1* | 5/2010 | Miyano | 359/684 |

FOREIGN PATENT DOCUMENTS

| JP | 2004-109993 A | 4/2004 |
| JP | 2009-037036 A | 2/2009 |

* cited by examiner

*Primary Examiner* — Jordan Schwartz
(74) *Attorney, Agent, or Firm* — Rossi, Kimms & McDowell LLP

(57) ABSTRACT

A zoom lens includes, in order from object side, a positive first lens unit which does not move for varying magnification, a negative second lens unit which moves for varying magnification, a negative third lens unit which moves for varying magnification, and a positive fourth lens unit which does not move for varying magnification, wherein the first lens unit includes a positive lens which satisfies the following conditions: $70 < \nu_p < 85$; $2.31 < N_p + 0.01 \times \nu_p < 2.58$; and $1.6 < N_p < 1.85$, where $N_p$ is refractive index of the positive lens, and $\nu_p$ is Abbe constant of the positive lens, and $1.25 < |f_p/f_{na}| < 1.7$ is satisfied, where $f_p$ is focal length of the positive lens, and $f_{na}$ is combined focal length of negative lenses in the first lens unit defined by the equation:

$$f_{na} = \frac{1}{\sum_{i=1}^{n} \frac{1}{f_{n_i}}},$$

where n is a number of the negative lenses in the first lens unit, and $f_{n_i}$ is focal length of the i-th negative lens.

9 Claims, 9 Drawing Sheets

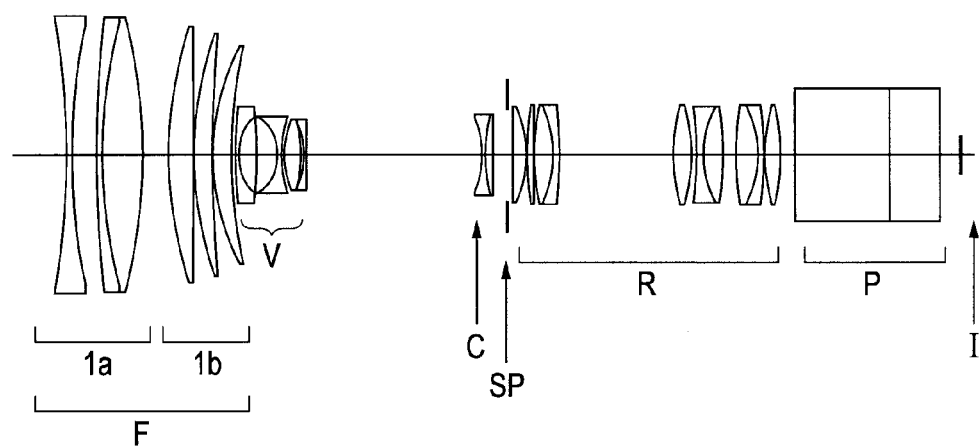
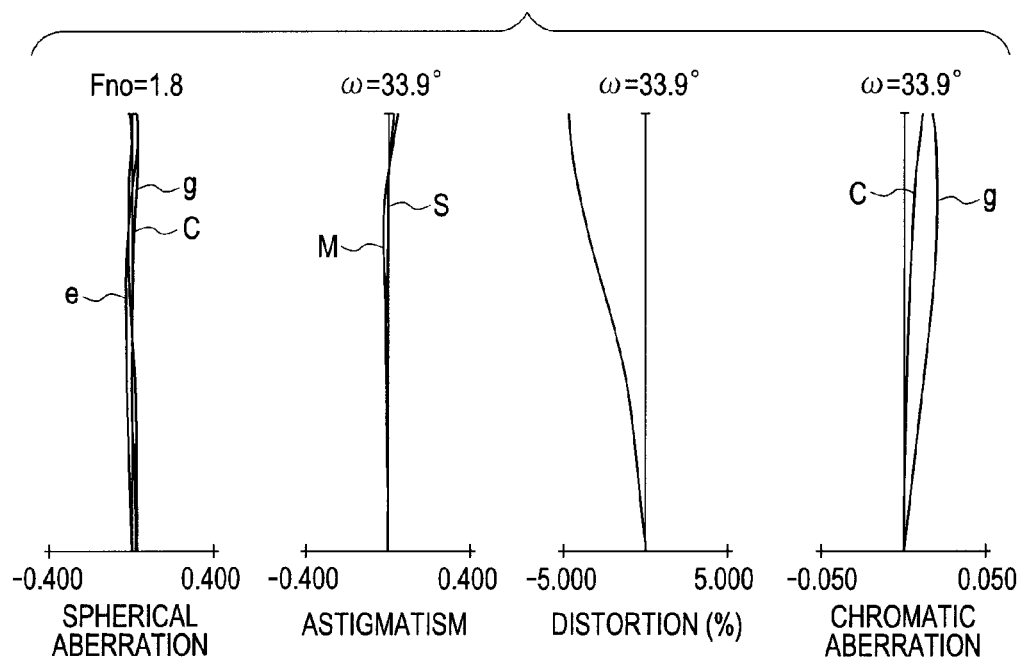

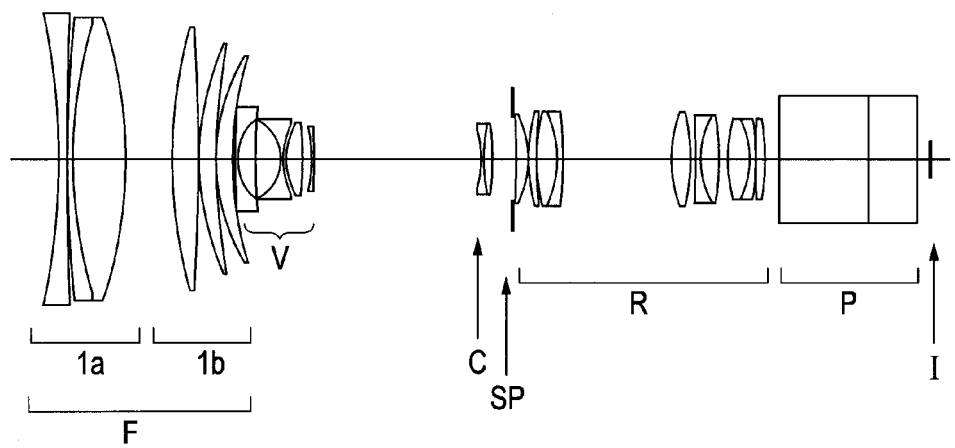
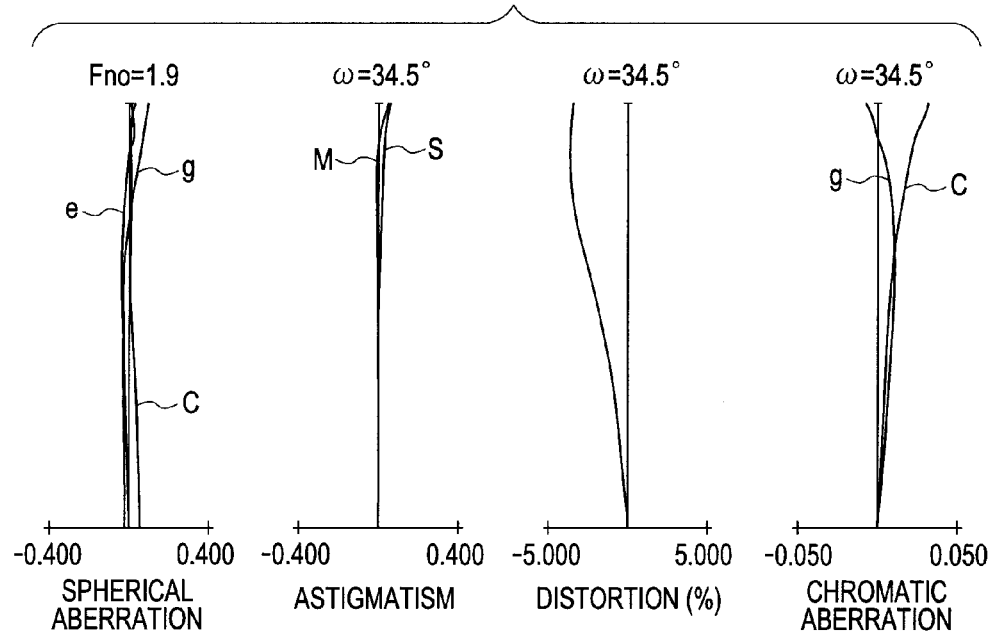

C-LINE, F-LINE   g-LINE

PARTIAL DISPERSION RATIO $\theta$

ABBE CONSTANT $\nu$

ZOOM LENS AND IMAGE PICKUP APPARATUS HAVING THE SAME

BACKGROUND OF THE INVENTION

1. Field of the Invention

The present invention relates to a zoom lens which is suitable for use in a TV camera, a video camera, a still camera and a digital camera, in particular to a small, light-weighted zoom lens which has excellent performance with good chromatic aberration characteristics at the telephoto end, while having a high zoom ratio higher than 15. The present invention also relates to an image pickup apparatus having such a zoom lens.

2. Description of the Related Art

Heretofore, there have been developed many zoom lenses composed of four lens units including in order from the object side a first lens unit having a positive refractive power which does not move for zooming, a second lens unit having a negative refractive power for varying magnification, a third lens unit having a negative refractive power for correcting image plane variation due to the varying of the magnification, and a fourth lens unit having a positive refractive power which does not move for zooming.

Japanese Patent Application Laid-Open Nos. 2004-109993 and 2009-037036 disclose as numerical embodiments zoom lenses having a high zoom ratio as high as 18 to 21 and an angle of field not smaller than 55 degrees and smaller than 75 degrees at the wide angle end. However, in the zoom lenses disclosed as numerical embodiments in Japanese Patent Application Laid-Open Nos. 2004-109993 and 2009-037036, the dispersion of the positive lenses in the first lens unit is not small and the refractive index thereof is not sufficiently high, resulting in insufficient correction of aberrations at the telephoto end and failing to achieve high performance and small size at the same time.

SUMMARY OF THE INVENTION

An object of the present invention is to provide a zoom lens which is particularly suitable for use in a broadcasting camera, has a zoom ratio as high as or higher than 15, and has well-corrected chromatic aberration characteristics in the telephoto zoom range. It is also an object of the present invention to provide an image pickup apparatus having such a zoom lens.

To achieve the above object, a zoom lens and an image pickup apparatus having the same according to the present invention comprise, in order from the object side, a first lens unit having a positive refractive power which does not move for varying magnification, a second lens unit having a negative refractive power which moves for varying magnification, a third lens unit having a negative refractive power which moves for varying magnification, and a fourth lens unit having a positive refractive power which does not move for varying magnification, wherein the first lens unit includes a positive lens which satisfies the following conditions:

$$70 < vp < 85,$$

$$2.31 < Np + 0.01 \times vp < 2.58, \text{ and}$$

$$1.6 < Np < 1.85,$$

where Np is a refractive index of the positive lens, and vp is an Abbe constant of the positive lens, and wherein the following condition is satisfied:

$$1.25 < |fp/fna| < 1.7,$$

where fp is a focal length of the positive lens, and fna is a combined focal length of negative lenses included in the first lens unit.

The combined focal length fna is defined by the following equation:

$$fna = \frac{1}{\sum_{i=1}^{n} \frac{1}{fn_i}},$$

where n is a number of the negative lenses included in the first lens unit, and fni is a focal length of the i-th negative lens.

Further features of the present invention will become apparent from the following description of exemplary embodiments with reference to the attached drawings.

The present invention can provide a small, light-weight zoom lens having high performance with well-corrected chromatic aberration in the telephoto zoom range while having a zoom ratio as high as or higher than 15.

BRIEF DESCRIPTION OF THE DRAWINGS

FIG. 1 is a cross sectional view of a zoom lens according to a first embodiment in the state at the wide angle end.

FIG. 2A is an aberration diagram of the zoom lens according to the first embodiment at the wide angle end.

FIG. 3 is a cross sectional view of a zoom lens according to a second embodiment in the state at the wide angle end.

FIG. 4A is an aberration diagram of the zoom lens according to the second embodiment at the wide angle end.

DESCRIPTION OF THE EMBODIMENTS

Figure 2B:
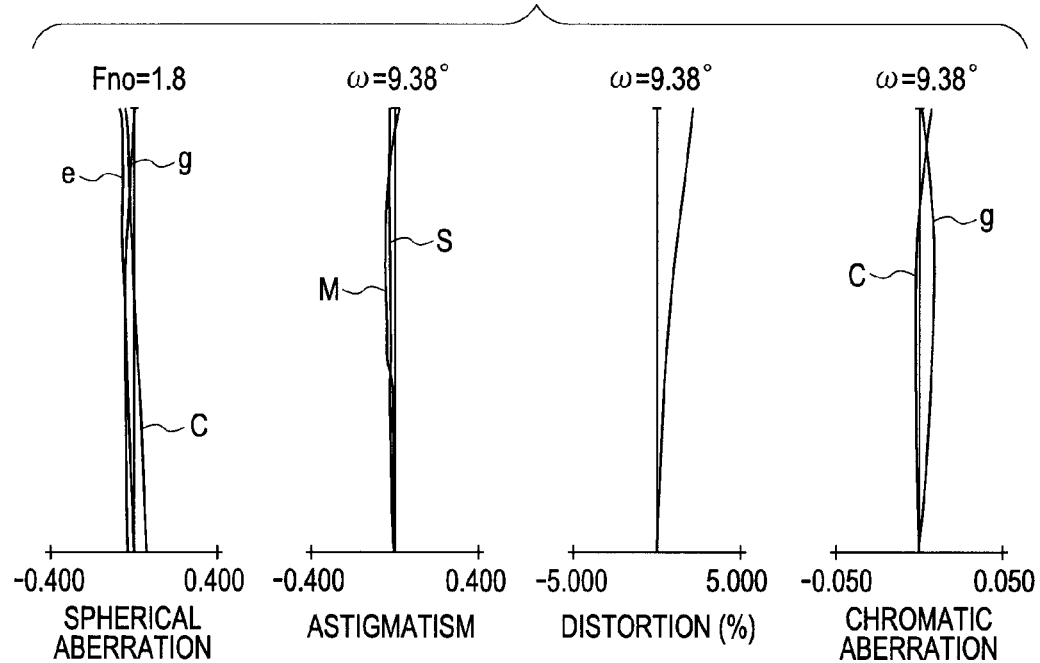
FIG. 2B is an aberration diagram of the zoom lens according to the first embodiment at a focal length f of 33.29 mm.

Preferred embodiments of the present invention will now be described in detail in accordance with the accompanying drawings.

In the zoom lens according to the present invention, the refractive index and dispersion properties of a positive lens in the first lens unit and the ratio of the refractive power of the aforementioned positive lens and the refractive power of a negative lens are specified so that excellent correction of chromatic aberration at the telephoto end and the downsizing of the overall size of the zoom lens are both achieved.

The zoom lens includes, in order from the object side, a first lens unit having a positive refractive power which does not move for varying magnification, a second lens unit having a negative refractive power which moves for varying magnification, a third lens unit having a negative refractive power which moves for correcting image plane variation caused by the variation in magnification, and a fourth lens unit having a positive refractive power which does not move for varying magnification.

The first lens unit includes a positive lens which satisfies the following conditional expressions (1), (2) and (3):

$$70 < \nu p < 85 \quad (1)$$

$$2.31 < Np + \nu p \times 10^{-2} < 2.58 \quad (2)$$

$$1.6 < Np < 1.85 \quad (3),$$

where Np is the refractive index of the aforementioned positive lens, νp is the Abbe constant of the aforementioned positive lens. Moreover, the following conditional expression (4) is satisfied:

$$1.25 < |fp/fna| < 1.7 \quad (4),$$

where fp is the focal length of the positive lens satisfying conditional expressions (1), (2) and (3), and fna is the combined focal length of the negative lenses included in the first lens unit.

When the first lens unit includes n negative lenses, the combined focal length fna as defined herein is expressed by the following equation:

$$fna = \frac{1}{\sum_{i=1}^{n} \frac{1}{fn_i}}$$

where $fn_i$ is the focal length of the i-th negative lens.

Characteristics of the zoom lens having the above-described basic configuration will be described in the following.

Conditional expressions (1), (2), and (3) specify properties of the optical material of the positive lens in the first lens unit having high refractive index and low dispersion. Optical glasses generally contain many kinds of metal oxides, such as $SiO_2$, $TiO_2$, $La_2O_3$, $Al_2O_3$, $Nb_2O_5$, $ZrO_2$, and $Gd_2O_3$ for example. Among the metal oxides, for example, $TiO_2$ contributes to increasing the refractive index and decreasing the Abbe constant. Consequently, glass materials containing a large amount of $TiO_2$ characteristically have a relatively high refractive index and relatively high dispersion. It is also known that $Gd_2O_3$ contributes to increasing the refractive index and increasing the Abbe constant. Consequently, glass materials containing a large amount of $Gd_2O_3$ characteristically have a relatively high refractive index and relatively low dispersion. $TiO_2$ and $Gd_2O_3$ inherently have high refractive index and high dispersion characteristics, and high refractive index and low dispersion characteristics, respectively, and characteristics of glass materials containing these metal oxides become close to the characteristics inherent to the metal oxides.

As above, characteristics of an optical glass vary in accordance with the amounts of metal oxides contained therein, and a glass having desired optical characteristics can be obtained by arranging the amounts or proportions of its components appropriately. This also applies to optical ceramics. For example, an optical ceramic containing a large amount of a material(s) having high refractive index, low dispersion characteristics will have relatively high refractive index and low dispersion characteristics.

Materials having a high refractive index and low dispersion include $Gd_2O_3$ and $Al_2O_3$ mentioned above and $Lu_3Al_5O_{12}$. An optical material such as an optical glass or ceramic having desired optical properties (refractive index and Abbe constant) can be obtained by appropriately arranging the amounts of the respective materials and metal oxides such as $SiO_2$, $TiO_2$ and $La_2O_3$ and melting or sintering their mixture.

Conditional expression (1) also specifies a condition for reducing the secondary spectrum residual amount of longitudinal chromatic aberration in the first lens unit and for achieving satisfactory correction of secondary spectrum of longitudinal chromatic aberration at the telephoto end.

Figure 9:
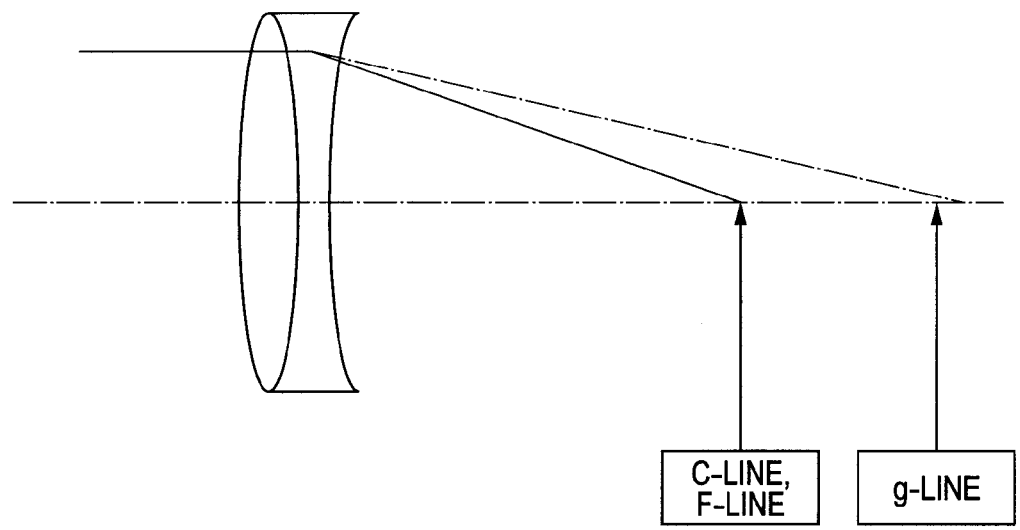
FIG. 9 schematically illustrates achromatism with respect to two colors and residual secondary spectrum in a positive lens unit.

FIG. 9 schematically illustrates achromatism with respect to two colors and residual secondary spectrum in a positive lens unit.

Figure 10:
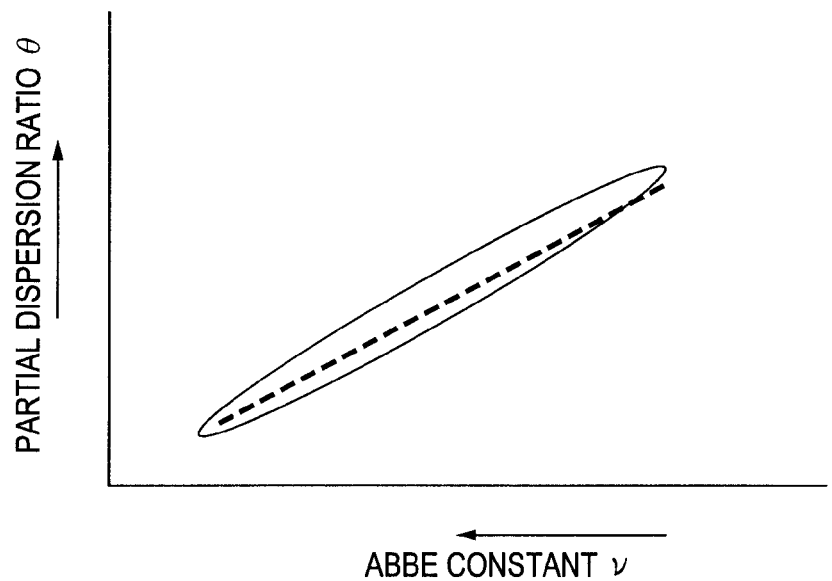
FIG. 10 schematically shows the distribution of the Abbe constants ν and partial dispersion ratios θ of optical materials.

FIG. 10 schematically shows the distribution of the Abbe constants ν and partial dispersion ratios θ of existing (or available) optical materials. The Abbe constant ν and the partial dispersion ratio θ are defined as follows:

$$\nu = (Nd-1)/(NF-NC) \quad (5)$$

$$\theta = (Ng-NF)/(NF-NC) \quad (6),$$

where Ng is the refractive index with respect to the g-line, NF is the refractive index with respect to the F-line, Nd is the refractive index with respect to the d line, and NC is the refractive index with respect to the C-line.

As will be seen from FIG. 10, the partial dispersion ratios θ of the existing optical materials are distributed in a narrow range in relation to the Abbe constants ν. In addition, the smaller the Abbe constant ν is, the larger the partial dispersion ratio θ tends to be.

A condition for correction of chromatic aberration of a thin lens system having a predetermined refractive power of φ and composed of two lenses 1, 2 having refractive powers of $\phi_1$ and $\phi_2$ and Abbe constants of $\nu_1$ and $\nu_2$ respectively is expressed by the following equation:

$$\phi_1/\nu_1 + \phi_2/\nu_2 = 0 \quad (7),$$

where the following equation holds:

$$\phi = \phi_1 + \phi_2 \quad (8).$$

If equation (7) is satisfied, the imaging position with respect to the C-line and that of the F-line coincide with each other.

Then, solving equations (7) and (8) gives the following expressions of the refractive powers $\phi_1$ and $\phi_2$:

$$\phi_1 = \phi \times \nu_1/(\nu_1 - \nu_2) \quad (9)$$

$$\phi_2 = -\phi \times \nu_2/(\nu_1 - \nu_2) \quad (10).$$

In FIG. 9, to achieve achromatism in the positive lens unit, a material having a large Abbe constant $\nu_1$ is used in the positive lens 1, and a material having a small Abbe constant $\nu_2$ is used in the negative lens 2. Consequently, the positive lens 1 has a small partial dispersion ratio $\theta_1$, and the negative lens has a large partial dispersion ratio $\theta_2$ according to the relationship shown in FIG. 10. Therefore, if chromatic aberration is corrected with respect to the F-line and the C-line, the image point with respect to the g-line is displaced toward the image side. The secondary spectrum amount Δ defined here as this displacement is expressed by the following equation:

$$\Delta = (1/\phi) \times (\theta_2 - \theta_1)/(\nu_1 - \nu_2) \quad (11).$$

The secondary spectrum amount Δ of the entire lens system is expressed by the following equation:

$$\Delta = \Delta_1 \times \beta_2^2 \times \beta_3^2 \times \beta_4^2 + \Delta_2 \times (1 - \beta_2) \times \beta_3^2 \times \beta_4^2 + \Delta_3 \times (1 - \beta_3) \times \beta_4^2 + \Delta_4 \times (1 - \beta_4) \quad (12)$$

where $\Delta_1$, $\Delta_2$, $\Delta_3$ and $\Delta_4$ are the secondary spectrum amounts of the first, second, third and fourth lens units respectively, and $\beta_1$, $\beta_2$, $\beta_3$ and $\beta_4$ are imaging magnifications of the first, second, third and fourth lens units respectively.

A large amount of secondary spectrum Δ is generated in the first lens unit, in which axial marginal rays pass through high image height in the telephoto zoom range. Therefore, a reduction of the secondary spectrum amount $\Delta_1$ of the longitudinal chromatic aberration generated in the first lens unit can lead to a reduction of longitudinal chromatic aberration Δ in the telephoto zoom range.

Conditional expression (1) specifies a condition concerning the Abbe constant of the positive lens in the first lens unit. If the lower limit of conditional expression (1) is not satisfied, the value of the Abbe constant $\nu_1$ in equation (11) will be so small and the value of the secondary spectrum amount $\Delta_1$ in equation (11) will be so large that it will be difficult to correct longitudinal chromatic aberration at the telephoto end. Then, in addition, the refractive power of each single lens in the first lens unit will be so large that it will be difficult to correct aberrations, in particular spherical aberration and coma, at the telephoto end. If the upper limit of conditional expression (1) is not satisfied, it will be difficult to produce a glass material having low dispersion and high refractive index.

Conditional expression (2) specifies a condition concerning the relationship between the Abbe constant and the refractive index of the positive lens in the first lens unit. If the lower limit of conditional expression (2) is not satisfied, the glass material of the positive lens will not have high refractive index and low dispersion. Then, it will be difficult to correct aberrations at the telephoto end while downsizing the zoom lens and high zoom ratio. If the upper limit of conditional expression (2) is not satisfied, it will be difficult to produce a glass material having low dispersion and high refractive index.

Conditional expression (3) specifies a condition concerning the refractive index of the positive lens in the first lens unit. If the lower limit of conditional expression (3) is not satisfied, the curvature of the positive lens will be so large that it will be difficult to correct aberrations, in particular spherical aberration and coma, at the telephoto end. Then, in addition, the thickness of the positive lens will be so large that it will be difficult to downsize the zoom lens. If the upper limit of conditional expression (3) is not satisfied, it will be difficult to produce a glass material having low dispersion and high refractive index.

Conditional expression (4) limits the ratio of refractive power of the negative lens(es) in the first lens unit to the refractive power of the positive lens in the first lens unit. If the conditional expression (4) is not satisfied, it will be difficult to appropriately correct chromatic aberration generated by the positive lens in the first lens unit by the negative lens(es). In consequence, it will be difficult to correct longitudinal chromatic aberration and lateral chromatic aberration at the telephoto end.

In the zoom lens according to the present invention, furthermore, a limitation on the ratio of the focal length of the zoom lens at the telephoto end and the focal length of the first lens unit and a limitation on the ratio of the focal length of the zoom lens at the telephoto end and the focal length of the positive lens in the first lens unit may be placed, thereby enabling excellent correction of longitudinal chromatic aberration while achieving high zoom ratio.

Specifically, the following conditional expression (13) is satisfied:

$$1.8 < f\text{tele}/f1 < 2.7 \quad (13),$$

where f1 is the focal length of the first lens unit, and ftele is the focal length of the zoom lens at the telephoto end.

If the lower limit of conditional expression (13) is not satisfied, the focal length of the first lens unit will be so large that it will be difficult to achieve both high zoom ratio and small size. If the upper limit of conditional expression (13) is not satisfied, the ratio of enlargement of secondary spectrum generated by the first lens unit at the telephoto end will become so large that it will be difficult to excellently correct longitudinal chromatic aberration at the telephoto end while achieving high zoom ratio.

Furthermore, the following conditional expression (14) is satisfied.

$$0.9 < f\text{tele}/fp < 1.3 \quad (14)$$

If the lower limit of conditional expression (14) is not satisfied, the refractive power of the positive lens having high refractive power and high partial dispersion ratio will be so small that it will be difficult to excellently correct aberrations at the telephoto end while achieving high zoom ratio and downsizing the zoom lens. If the upper limit of conditional expression (14) is not satisfied, the ratio of enlargement of secondary spectrum generated by the aforementioned positive lens at the telephoto end will become so large that it will be difficult to excellently correct longitudinal chromatic aberration at the telephoto end while achieving high zoom ratio.

In the zoom lens according to the present invention, furthermore, limitations on dispersion characteristics of the materials of lenses in the first lens unit may be placed, thereby enabling excellent correction of secondary spectrum of longitudinal chromatic aberration at the telephoto end.

Specifically, the following conditional expression (15) is satisfied:

$$-1.7 \times 10^{-3} < (\theta p - \theta na)/(\nu p - \nu na) < -1.0 \times 10^{-3} \quad (15),$$

where θp is the partial dispersion ratio of the aforementioned positive lens in the first lens unit, νna is the average of the Abbe constants of the negative lenses in the first lens unit, θna is the average of the partial dispersion ratios of the negative lenses in the first lens unit (the partial dispersion ratio θ=(Ng−NF)/(NF−NC)).

If the lower limit of conditional expression (15) is not satisfied, a large amount of secondary spectrum in the first lens unit will result according to equation (11), making it difficult to correct longitudinal chromatic aberration at the telephoto end excellently. If the upper limit of conditional expression (15) is not satisfied, it will be difficult to produce a glass material having low dispersion, high refractive index, and high partial dispersion ratio for use in the positive lens.

Furthermore, the following conditional expression (16) is satisfied.

$$40 < \nu p - \nu na < 55 \quad (16)$$

If the lower limit of conditional expression (16) is not satisfied, a large amount of secondary spectrum in the first lens unit will result according to equation (11), making it difficult to correct longitudinal chromatic aberration at the telephoto end excellently. The positive lens and the negative lens(es) in the first lens unit will have high refractive power. This makes correction of aberrations, in particular spherical aberration and coma, at the telephoto end difficult. If the upper limit of conditional expression (16) is not satisfied, it will be difficult to produce a glass material having low dispersion and high refractive index for use in the positive lens.

In the zoom lens according to the present invention, furthermore, an optimum composition of the first lens unit may be specified, thereby enabling excellent correction of chromatic aberration in the telephoto zoom range while achieving a zoom ratio as high as or higher than 15.

The first lens unit is composed of a first sub lens unit and a second sub lens unit. The first sub lens unit is a partial unit which does not move. The second sub lens unit is a partial unit having a positive refractive power which moves for focusing. The first sub lens unit includes two or more negative lenses and one or more positive lenses. If the number of the negative lenses included in the first lens unit is one, the curvature and refractive power of the negative lens will become high. Then, it will be difficult to correct aberrations (in particular, spherical aberration and coma) at the telephoto end and aberrations (in particular, field curvature and distortion) at the wide angle end.

In the zoom lens according to the present invention, furthermore, the field angle at the wide angle end may be limited appropriately, thereby enabling correction of chromatic aberration in the telephoto zoom range while making the zoom lens compact.

Specifically, the following conditional expression (17) is satisfied:

$$0.6 < fwide/IS < 0.8 \quad (17)$$

where fwide is the focal length of the zoom lens at the wide angle end, and IS is the diagonal length of the image size.

If the lower limit of conditional expression (17) is not satisfied, the effective diameter of the firs lens unit will become large. Then, it will be difficult to downsize the zoom lens.

In the zoom lens according to the present invention, furthermore, a limitation may be placed on the ratio of the focal length at the telephoto end and the focal length at the wide angle end (i.e. the zoom ratio) as expressed by the following conditional expression (18), thereby enabling excellent correction of longitudinal chromatic aberration in the telephoto zoom range while downsizing the zoom lens.

$$15 < ftele/fwide \quad (18)$$

The zoom lens of the present invention can satisfy the following conditional expression, $$-0.8 < f3/f1 < -0.5 \quad (19)$$

where f1 represents the focal length of the first lens unit and f3 represents the focal length of the third lens unit. Further, the upper and lower limits of the above defined conditional expressions (1)-(4) and (13)-(19) can arbitrarily be replaced as described in the below described conditional expressions (1a)-(4a) and (13a)-(19a).

$$71 < vp < 83 \quad (1a)$$

$$2.40 < Np + vp \times 10^{-2} < 2.56 \quad (2a)$$

$$1.70 < Np < 1.80 \quad (3a)$$

$$1.42 < |fp/fna| < 1.68 \quad (4a)$$

$$1.95 < ftele/f1 < 2.50 \quad (13a)$$

$$0.96 < ftele/fp < 1.28 \quad (14a)$$

$$-1.43 \times 10^{-3} < (\theta p - \theta na)/(vp - vna) < -1.10 \times 10^{-3} \quad (15a)$$

$$42.0 < vp - vna < 54.0 \quad (16a)$$

$$0.65 < fwide/IS < 0.77 \quad (17a)$$

$$17 < ftele/fwide < 100 \quad (18a)$$

$$-0.75 < f3/f1 < -0.55 \quad (19a)$$

In the zoom lens according to the present invention, furthermore, an optimum composition of the first lens unit may be specified in order to excellently correct chromatic aberrations in the telephoto zoom range while achieving a high zoom ratio higher than 15. Specifically, having a plurality of positive lenses each satisfying conditional expressions (1), (2) and (3) in the first lens unit (which leads to having a plurality of lenses each made of a glass having low dispersion and high refractive index) enables more excellent correction of aberrations in the telephoto zoom range.

If an image pickup apparatus has a zoom lens according to the present invention, the image pickup apparatus can enjoy excellent optical characteristics of the zoom lens according to the present invention.

First Embodiment

Figure 2C:
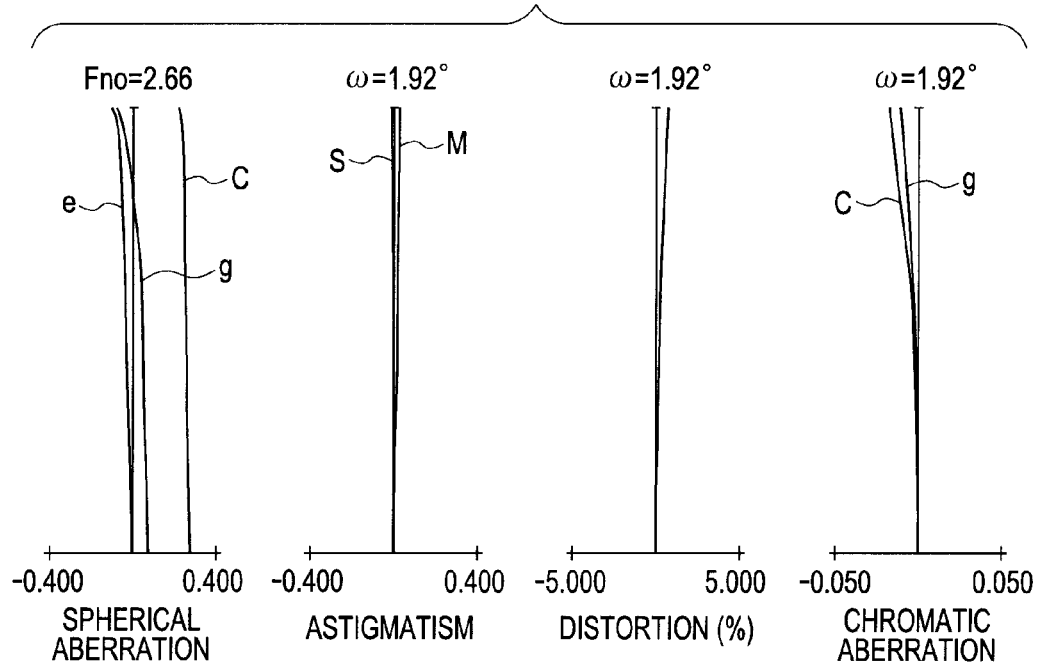
FIG. 2C is an aberration diagram of the zoom lens according to the first embodiment at the telephoto end.

FIG. 1 is a cross sectional view of a zoom lens according to numerical embodiment 1 as a first embodiment of the present invention in the state at the wide angle end. FIGS. 2A, 2B and 2C are aberration diagrams of numerical embodiment 1 respectively at the wide angle end, at a focal length f of 33.29 mm and at the telephoto end. In the aberration diagrams, curves "e" represent aberrations with respect to the e-line, curves "g" represent aberrations with respect to the g-line, curves represent aberrations with respect to the C-line, curves "M" represent aberrations in meridional image plane, and curves "S" represent aberrations in sagittal image planes. This also applies to all the embodiments described in the following.

As shown in FIG. 1, the zoom lens according to this embodiment has a front lens unit F having a positive refractive power, which constitutes the first lens unit, a variator V having a negative refractive power for varying magnification (moving for varying magnification), which constitutes the second lens unit, and a compensator C having a negative refractive power, which constitutes the third lens unit. The first lens unit F includes a sub lens unit 1a which is located closest to the object side and does not move for varying magnification or for focusing and a positive sub lens unit 1b which does not move for varying magnification but moves for focusing. The variator V moves monotonically toward the image plane side along the optical axis to vary magnification from the wide angle end to the telephoto end. The compensator C (the third lens unit) is a unit which moves when varying magnification (specifically, moves along the optical axis toward the object side in a nonlinear manner to correct image plane variation caused with variation of magnification). The compensator C has a negative refractive power in this embodiment. The variator V and the compensator C constitute a magnification varying system. The zoom lens according to this embodiment further includes a stop SP, a fixed (or immobile) relay lens unit R having a positive refractive power for imaging, which constitutes the fourth lens unit, a color splitting prism, and an optical filter. In FIG. 1, the color splitting prism and the optical filter are collectively illustrated as a glass block P. The image plane I is also illustrated in FIG. 1.

In the following, the first lens unit in this embodiment will be described in detail. The first lens unit includes the first to eleventh optical surfaces numbered in order from the object side. The first lens unit is constituted, in order from the object side, by a negative lens, a cemented lens made up of a negative lens and a positive lens, a positive lens, a positive lens and a positive lens. The third lens in order from the object side among the three positive lenses in the sub lens unit 1b constitutes the positive lens which satisfies conditional expressions (1), (2) and (3) in the first lens unit.

Aspheric surfaces are expressed by the following equation in terms of the height H from the optical axis and the displacement X along the optical axis from the fiducial point at the surface vertex:

$$X = \frac{(1/R)H^2}{1 + \sqrt{1-(1+K)(H/R)^2}} + A3 \cdot H^3 + A4 \cdot H^4 + A5 \cdot H^5 + A6 \cdot H^6 +$$

$$A7 \cdot H^7 + A8 \cdot H^8 + A9 \cdot H^9 + A10 \cdot H^{10} + A11 \cdot H^{11} + A12 \cdot H^{12},$$

where A3 to A12 are aspherical coefficients, R is the paraxial radius of curvature, and K is a conic constant.

The values associated with the conditional expressions are presented for this embodiment in Table 1. This numerical embodiment satisfies all the conditional expressions, is small in size while having a high zoom ratio higher than 15, and has excellent optical performance with well-corrected chromatic aberration at the telephoto end.

| (Numerical Embodiment 1) | | | | | | | |
|---|---|---|---|---|---|---|---|
| SN | r | d | nd | νd | θgF | ED | FL |
| 1 | −223.45343 | 1.80000 | 1.749505 | 35.33 | 0.5818 | 82.244 | −137.397 |
| 2 | 194.06538 | 7.63289 | 1.000000 | 0.00 | 0.0000 | 80.932 | 0.000 |
| 3 | 364.95393 | 1.80000 | 1.805181 | 25.42 | 0.6161 | 81.553 | −349.851 |
| 4 | 159.45624 | 12.75657 | 1.603001 | 65.44 | 0.5402 | 81.360 | 130.591 |
| 5 | −151.97488 | 7.51342 | 1.000000 | 0.00 | 0.0000 | 81.403 | 0.000 |
| 6 | 121.54321 | 7.78135 | 1.496999 | 81.54 | 0.5374 | 77.484 | 242.193 |
| 7 | −17493.36128 | 0.15000 | 1.000000 | 0.00 | 0.0000 | 76.885 | 0.000 |
| 8 | 108.73357 | 5.88409 | 1.603001 | 65.44 | 0.5402 | 72.614 | 243.017 |
| 9 | 408.59180 | 0.15000 | 1.000000 | 0.00 | 0.0000 | 71.782 | 0.000 |
| 10 | 70.43354 | 5.76546 | 1.75000 | 80.00 | 0.5350 | 65.003 | 163.947 |
| 11 | 158.45221 | (variable) | 1.00000 | 0.00 | 0.0000 | 63.888 | 0.000 |
| 12 | 228.51871 | 0.70000 | 1.882997 | 40.76 | 0.5667 | 28.537 | −19.524 |
| 13 | 16.09375 | 5.92575 | 1.000000 | 0.00 | 0.0000 | 23.056 | 0.000 |
| 14 | −123.22284 | 6.59158 | 1.805181 | 25.42 | 0.6161 | 22.806 | 20.658 |
| 15 | −15.12931 | 0.70000 | 1.754998 | 52.32 | 0.5476 | 22.449 | −13.274 |
| 16 | 30.69250 | 0.68266 | 1.000000 | 0.00 | 0.0000 | 20.578 | 0.000 |
| 17 | 23.41300 | 0.00000 | 1.603420 | 38.03 | 0.5835 | 20.701 | 0.000 |
| 18 | 23.41300 | 5.61128 | 1.603420 | 38.03 | 0.5835 | 20.701 | 25.084 |
| 19 | −39.63535 | 0.87654 | 1.000000 | 0.00 | 0.0000 | 20.116 | 0.000 |
| 20 | −24.85315 | 0.00000 | 1.834807 | 42.71 | 0.5642 | 20.060 | 0.000 |
| 21 | −24.85315 | 0.70000 | 1.834807 | 42.71 | 0.5642 | 20.060 | −36.411 |
| 22 | −134.69050 | (variable) | 1.000000 | 0.00 | 0.0000 | 20.030 | 0.000 |
| 23 | −28.31196 | 0.70000 | 1.743198 | 49.34 | 0.5530 | 21.016 | −23.517 |
| 24 | 46.74031 | 2.80000 | 1.846660 | 23.78 | 0.6205 | 23.024 | 53.738 |
| 25 | −2634.95643 | (variable) | 1.000000 | 0.00 | 0.0000 | 23.582 | 0.000 |
| 26 | 0.00000 | 1.30000 | 1.000000 | 0.00 | 0.0000 | 27.173 | 0.000 |
| 27 | 360.02406 | 4.37816 | 1.658441 | 50.88 | 0.5561 | 28.456 | 48.297 |
| 28 | −34.89116 | 0.15000 | 1.000000 | 0.00 | 0.0000 | 28.872 | 0.000 |
| 29 | 93.08862 | 2.19749 | 1.516330 | 64.14 | 0.5352 | 29.438 | 175.279 |
| 30 | −3728.15108 | 0.15000 | 1.000000 | 0.00 | 0.0000 | 29.412 | 0.000 |
| 31 | 89.50375 | 5.99606 | 1.516330 | 64.14 | 0.5352 | 29.351 | 46.348 |
| 32 | −32.07960 | 1.80000 | 1.834000 | 37.16 | 0.5775 | 29.170 | −45.285 |
| 33 | −210.90952 | 35.20000 | 1.000000 | 0.00 | 0.0000 | 29.472 | 0.000 |
| 34 | 50.75524 | 5.87995 | 1.516330 | 64.14 | 0.5352 | 29.416 | 51.234 |
| 35 | −53.47900 | 1.66628 | 1.000000 | 0.00 | 0.0000 | 29.069 | 0.000 |
| 36 | −77.65579 | 1.80000 | 1.834807 | 42.71 | 0.5642 | 28.026 | −24.898 |
| 37 | 28.90020 | 6.25307 | 1.517417 | 52.43 | 0.5564 | 27.645 | 42.686 |
| 38 | −88.44268 | 4.16857 | 1.000000 | 0.00 | 0.0000 | 27.910 | 0.000 |
| 39 | 86.74243 | 6.92791 | 1.487490 | 70.23 | 0.5300 | 28.439 | 47.050 |
| 40 | −30.50355 | 1.80000 | 1.834000 | 37.16 | 0.5775 | 28.316 | −46.521 |
| 41 | −143.17764 | 0.17683 | 1.000000 | 0.00 | 0.0000 | 29.013 | 0.000 |
| 42 | 52.44781 | 4.89567 | 1.518229 | 58.90 | 0.5456 | 29.347 | 58.673 |
| 43 | −70.71601 | 4.50000 | 1.000000 | 0.00 | 0.0000 | 29.186 | 0.000 |
| 44 | 0.00000 | 30.00000 | 1.603420 | 38.01 | 0.5795 | 40.000 | 0.000 |
| 45 | 0.00000 | 16.20000 | 1.516330 | 64.15 | 0.5352 | 40.000 | 0.000 |
| 46 | 0.00000 | 0.00000 | 1.000000 | 0.00 | 0.0000 | 40.000 | 0.000 |

-continued

In the above table, "SN" stands for "Surface Number, "ED" stands for "Effective Diameter, and "FL" stands for focal length.

Aspheric Surface Data
12th surface

| K = 8.58860e+000 | A4 = 7.05832e−006 | A6 = −1.80303e−008 |
| A8 = 7.49637e−011 | A10 = −8.01854e−013 | A12 = 5.80206e−015 |
| A3 = −4.50041e−007 | A5 = 1.66019e−008 | A7 = −8.87373e−010 |
| A9 = 1.99340e−011 | A11 = −1.17115e−013 | |

Various Data
zoom ratio 20.00

|  | wide angle | intermediate | telephoto |
| --- | --- | --- | --- |
| focal length | 8.20 | 33.29 | 164.00 |
| F-number | 1.80 | 1.80 | 2.66 |
| angle of field | 33.85 | 9.38 | 1.92 |
| image height | 5.50 | 5.50 | 5.5 |
| full lens length | 280.51 | 280.51 | 280.51 |
| BF | 7.50 | 7.50 | 7.50 |
| d11 | 1.42 | 37.40 | 53.80 |
| d22 | 55.23 | 13.88 | 5.98 |
| d25 | 4.40 | 9.77 | 1.28 |
| d46 | 7.50 | 7.50 | 7.50 |
| entrance P | 51.31 | 187.24 | 622.86 |
| exit p | 230.52 | 230.52 | 230.52 |
| front pp | 59.82 | 225.50 | 907.45 |
| rear pp | −0.70 | −25.80 | 156.50 |

(In the above table, "entrance p" refers to the position of the entrance pupil, "exit p" refers to the position of the exit pupil, "front pp" refers to the position of the front principal point, and "rear pp" refers to the position of the rear principal point. These abbreviations also apply to similar tables for numerical embodiments 2 to 4 presented in the following.)

Zoom Lens Unit Data

| unit | FS | FL | LUL | front pp | rear pp |
| --- | --- | --- | --- | --- | --- |
| 1 | 1 | 71.00 | 51.23 | 33.39 | 1.21 |
| 2 | 12 | −13.70 | 21.79 | 2.59 | −11.43 |
| 3 | 23 | −42.20 | 3.50 | −0.07 | −1.98 |
| 4 | 26 | 66.54 | 135.44 | 80.62 | −150.27 |

(In the above table, "FS" refers to the surface number of the first surface or the surface closest to the object side in each unit, "FL" refers to the focal length of each unit, "LUL" refers to the physical length of each unit, "front pp" refers to the position of the front principal point, and "rear pp" refers to the position of the rear principal point. These abbreviations also apply to similar tables for numerical embodiments 2 to 4 presented in the following.)

Second Embodiment

Figure 4B:
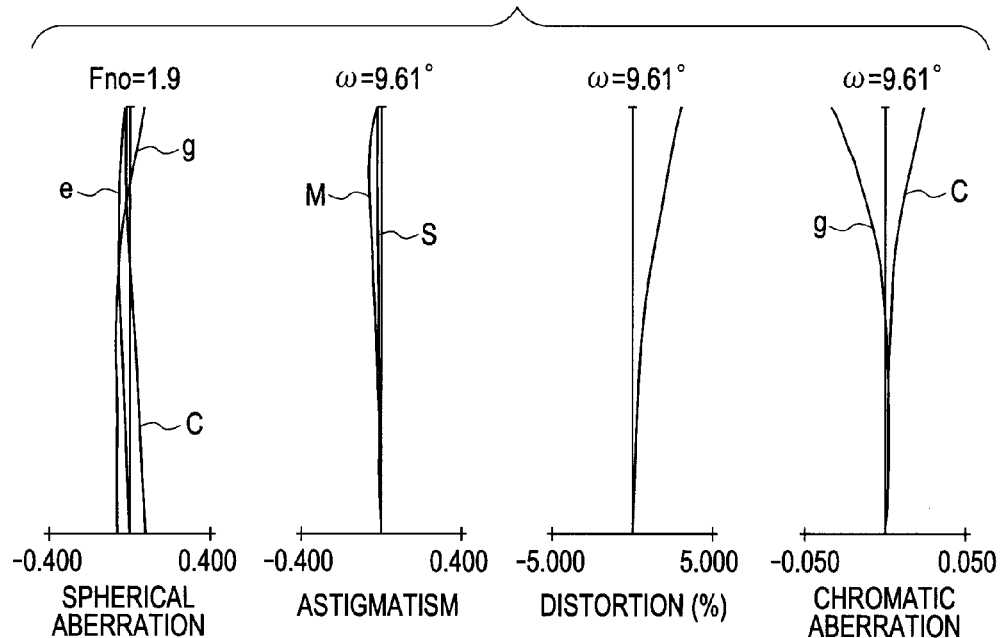
FIG. 4B is an aberration diagram of the zoom lens according to the second embodiment at a focal length f of 32.48 mm.
Figure 4C:
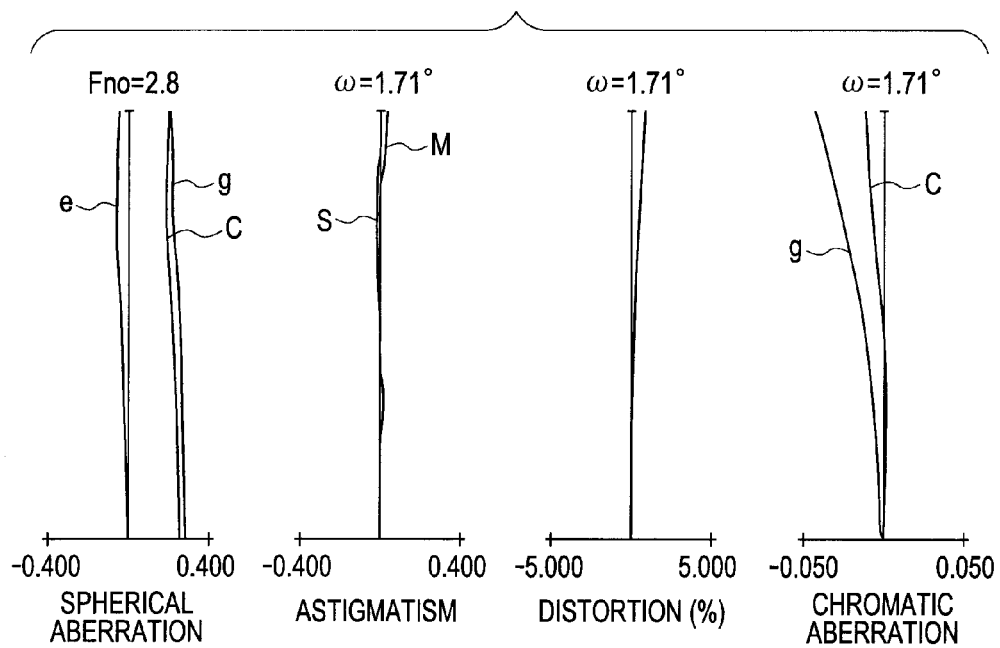
FIG. 4C is an aberration diagram of the zoom lens according to the second embodiment at the telephoto end.

FIG. 3 is a cross sectional view of a zoom lens according to numerical embodiment 2 as a second embodiment of the present invention in the state at the wide angle end. FIGS. 4A, 4B and 4C are aberration diagrams of numerical embodiment 2 respectively at the wide angle end, at a focal length f of 32.48 mm and at the telephoto end.

As shown in FIG. 3, the zoom lens according to this embodiment has a front lens unit F having a positive refractive power, which constitutes the first lens unit, a variator V having a negative refractive power for varying magnification, which constitutes the second lens unit, and a compensator C having a negative refractive power, which constitutes the third lens unit. The first lens unit F includes a sub lens unit 1a which is located closest to the object side and does not move for varying magnification or for focusing and a positive sub lens unit 1b which does not move for varying magnification but moves for focusing. The variator V moves monotonically toward the image plane side along the optical axis to vary magnification from the wide angle end to the telephoto end. The compensator C moves along the optical axis toward the object side in a nonlinear manner to correct image plane variation caused with variation of magnification. The variator V and the compensator C constitute a magnification varying system. The zoom lens according to this embodiment further includes a stop SP, a fixed (or immobile) relay lens unit R having a positive refractive power for imaging, which constitutes the fourth lens unit, a color splitting prism, and an optical filter. In FIG. 3, the color splitting prism and the optical filter are collectively illustrated as a glass block P. The image plane I is also illustrated in FIG. 3.

In the following, the first lens unit in this embodiment will be described in detail. The first lens unit includes the first to twelfth optical surfaces. The first lens unit is constituted, in order from the object side, by a negative lens, a cemented lens made up of a negative lens and a positive lens, a positive lens, a positive lens and a positive lens. The first lens in order from the object side among the three positive lenses in the sub lens unit 1b constitutes the positive lens which satisfies conditional expressions (1), (2) and (3) in the first lens unit.

The values associated with the conditional expressions are presented for this embodiment in Table 1. This numerical embodiment satisfies all the conditional expressions, is small in size while having a high zoom ratio higher than 15, and has excellent optical performance with well-corrected chromatic aberration at the telephoto end.

(Numerical Embodiment 2)

| SN | r | d | nd | vd | θgF | ED | FL |
|---|---|---|---|---|---|---|---|
| 1 | −207.12874 | 2.20000 | 1.903660 | 31.32 | 0.5947 | 92.610 | −195.098 |
| 2 | 1253.74480 | 0.22357 | 1.000000 | 0.00 | 0.0000 | 90.193 | 0.000 |
| 3 | 464.19661 | 1.80000 | 1.846660 | 23.78 | 0.6205 | 89.404 | −278.784 |
| 4 | 157.21405 | 0.00000 | 1.000000 | 0.00 | 0.0000 | 88.764 | 0.000 |
| 5 | 157.21405 | 17.78833 | 1.438750 | 94.93 | 0.5343 | 88.764 | 168.692 |
| 6 | −135.66403 | 15.28125 | 1.000000 | 0.00 | 0.0000 | 88.893 | 0.000 |
| 7 | 154.01514 | 9.06647 | 1.750000 | 80.00 | 0.5350 | 82.955 | 152.122 |
| 8 | −433.99120 | 0.15000 | 1.000000 | 0.00 | 0.0000 | 82.403 | 0.000 |
| 9 | 88.92908 | 5.40898 | 1.496999 | 81.54 | 0.5374 | 73.330 | 341.450 |
| 10 | 182.47319 | 0.15000 | 1.000000 | 0.00 | 0.0000 | 72.318 | 0.000 |
| 11 | 64.48551 | 5.33341 | 1.788001 | 47.37 | 0.5559 | 66.681 | 181.928 |
| 12 | 112.46327 | (variable) | 1.000000 | 0.00 | 0.0000 | 65.866 | 0.000 |
| 13 | −4711.01659 | 0.70000 | 1.882997 | 40.76 | 0.5667 | 32.299 | −18.209 |
| 14 | 16.22923 | 6.11952 | 1.000000 | 0.00 | 0.0000 | 25.191 | 0.000 |
| 15 | 178.48903 | 8.43733 | 1.805181 | 25.42 | 0.6161 | 25.035 | 17.040 |
| 16 | −14.69378 | 0.70000 | 1.785896 | 44.20 | 0.5631 | 24.775 | −12.099 |
| 17 | 27.93756 | 0.59326 | 1.000000 | 0.00 | 0.0000 | 22.149 | 0.000 |
| 18 | 22.10241 | 5.94868 | 1.603420 | 38.03 | 0.5835 | 22.417 | 28.377 |
| 19 | −70.20760 | 2.77320 | 1.000000 | 0.00 | 0.0000 | 21.771 | 0.000 |
| 20 | −32.38249 | 0.70000 | 1.834807 | 42.71 | 0.5642 | 20.267 | −44.223 |
| 21 | −256.06847 | (variable) | 1.000000 | 0.00 | 0.0000 | 20.139 | 0.000 |
| 22 | −28.30393 | 0.70000 | 1.743198 | 49.34 | 0.5530 | 19.306 | −23.480 |
| 23 | 46.57202 | 2.56654 | 1.846660 | 23.78 | 0.6205 | 20.876 | 53.545 |
| 24 | −2634.95643 | (variable) | 1.000000 | 0.00 | 0.0000 | 21.395 | 0.000 |
| 25 | 0.00000 | 1.30000 | 1.000000 | 0.00 | 0.0000 | 26.642 | 0.000 |
| 26 | −170.11950 | 3.89982 | 1.658441 | 50.88 | 0.5561 | 27.195 | 59.174 |
| 27 | −32.11307 | 0.15000 | 1.000000 | 0.00 | 0.0000 | 27.824 | 0.000 |
| 28 | 68.04045 | 2.75260 | 1.516330 | 64.14 | 0.5352 | 28.809 | 266.411 |
| 29 | 132.29771 | 0.15000 | 1.000000 | 0.00 | 0.0000 | 28.776 | 0.000 |
| 30 | 64.10290 | 6.71441 | 1.516330 | 64.14 | 0.5352 | 28.865 | 45.101 |
| 31 | −35.47253 | 1.80000 | 1.834000 | 37.16 | 0.5775 | 28.662 | −52.577 |
| 32 | −185.02472 | 36.00000 | 1.000000 | 0.00 | 0.0000 | 28.971 | 0.000 |
| 33 | 36.25477 | 6.44145 | 1.516330 | 64.14 | 0.5352 | 29.046 | 48.255 |
| 34 | −75.72963 | 1.66628 | 1.000000 | 0.00 | 0.0000 | 28.447 | 0.000 |
| 35 | −159.00624 | 1.80000 | 1.834807 | 42.71 | 0.5642 | 26.762 | −26.455 |
| 36 | 25.94676 | 6.27159 | 1.517417 | 52.43 | 0.5564 | 25.520 | 39.574 |
| 37 | −91.03732 | 2.50000 | 1.000000 | 0.00 | 0.0000 | 25.600 | 0.000 |
| 38 | 45.40373 | 7.46228 | 1.487490 | 70.23 | 0.5300 | 25.147 | 38.735 |
| 39 | −30.76105 | 1.80000 | 1.834000 | 37.16 | 0.5775 | 24.368 | −39.054 |
| 40 | −513.13421 | 0.17683 | 1.000000 | 0.00 | 0.0000 | 24.250 | 0.000 |
| 41 | 221.38660 | 3.34276 | 1.518229 | 58.90 | 0.5456 | 24.190 | 103.410 |
| 42 | −70.71601 | 4.50000 | 1.000000 | 0.00 | 0.0000 | 23.996 | 0.000 |
| 43 | 0.00000 | 30.00000 | 1.603420 | 38.01 | 0.5795 | 40.000 | 0.000 |
| 44 | 0.00000 | 16.20000 | 1.516330 | 64.15 | 0.5352 | 40.000 | 0.000 |
| 45 | 0.00000 | 0.00000 | 1.000000 | 0.00 | 0.0000 | 40.000 | 0.000 |

In the above table, "SN" stands for "Surface Number, "ED" stands for "Effective Diameter, and "FL" stands for focal length.

Aspheric Surface Data
13th surface

| K = 7.37782e+004 | A4 = 1.25381e−005 | A6 = 8.68114e−009 |
|---|---|---|
| A8 = −6.25554e−011 | A10 = 1.19225e−012 | A12 = 4.99158e−015 |
| A3 = −4.55264e−006 | A5 = −2.29691e−007 | A7 = −2.19772e−009 |
| A9 = 1.54902e−011 | A11 = −1.78164e−013 | |

Various Data
zoom ratio 23.00

| | wide angle | intermediate | telephoto |
|---|---|---|---|
| focal length | 8.00 | 32.48 | 184.00 |
| F-number | 1.90 | 1.90 | 2.80 |
| angle of field | 34.51 | 9.61 | 1.71 |
| image height | 5.50 | 5.50 | 5.50 |
| full lens length | 288.34 | 288.34 | 288.34 |
| BF | 3.86 | 3.86 | 3.86 |
| d12 | 0.73 | 35.81 | 51.94 |
| d21 | 55.03 | 15.05 | 9.67 |
| d24 | 7.14 | 12.05 | 1.30 |
| d45 | 3.86 | 3.8.6 | 3.86 |
| entrance P | 56.45 | 200.21 | 769.97 |
| exit p | 1325.43 | 1325.43 | 1325.43 |
| front pp | 64.50 | 233.49 | 979.59 |
| rear pp | −4.14 | −28.62 | 180.14 |

-continued

| Zoom Lens Unit Data | | | | | |
|---|---|---|---|---|---|
| unit | FS | FL | LUL | front pp | rear pp |
| 1 | 1 | 70.20 | 57.40 | 36.45 | −0.10 |
| 2 | 13 | −13.63 | 25.97 | 3.19 | −12.57 |
| 3 | 22 | −42.20 | 3.27 | −0.06 | −1.85 |
| 4 | 25 | 51.61 | 134.93 | 53.52 | −115.90 |

Third Embodiment

Figure 5:
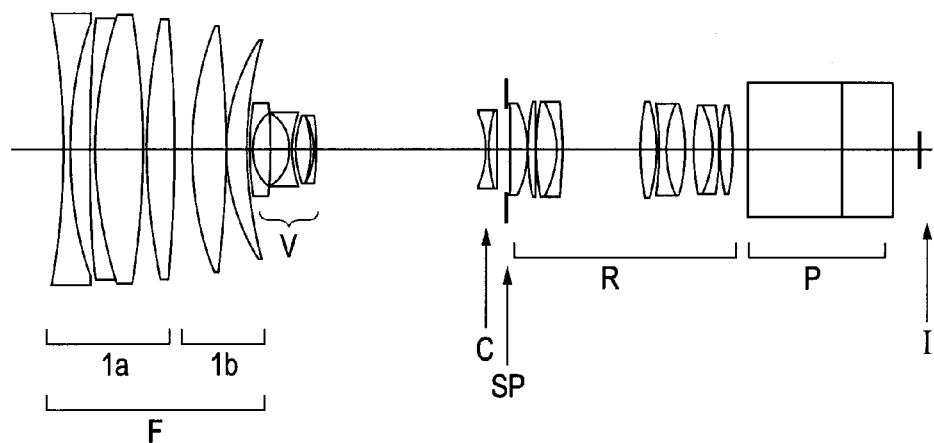
FIG. 5 is a cross sectional view of a zoom lens according to a third embodiment in the state at the wide angle end.
Figure 6A:
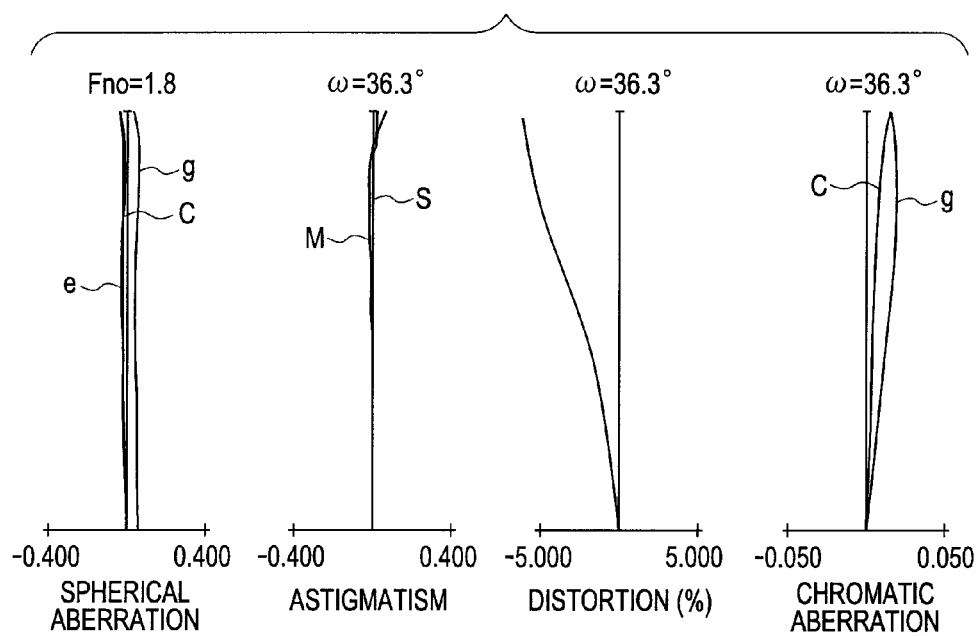
FIG. 6A is an aberration diagram of the zoom lens according to the third embodiment at the wide angle end.
Figure 6B:
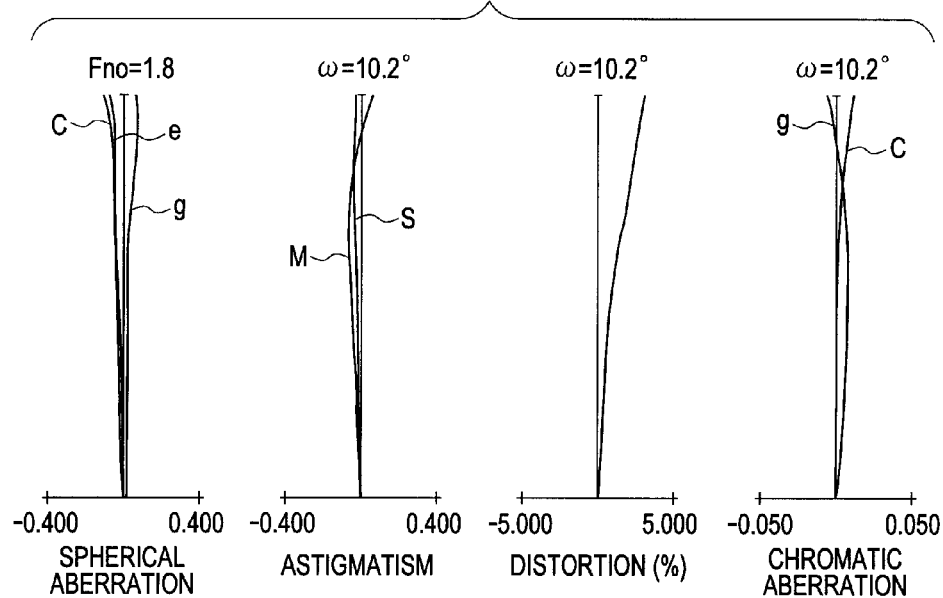
FIG. 6B is an aberration diagram of the zoom lens according to the third embodiment at a focal length f of 30.45 mm.
Figure 6C:
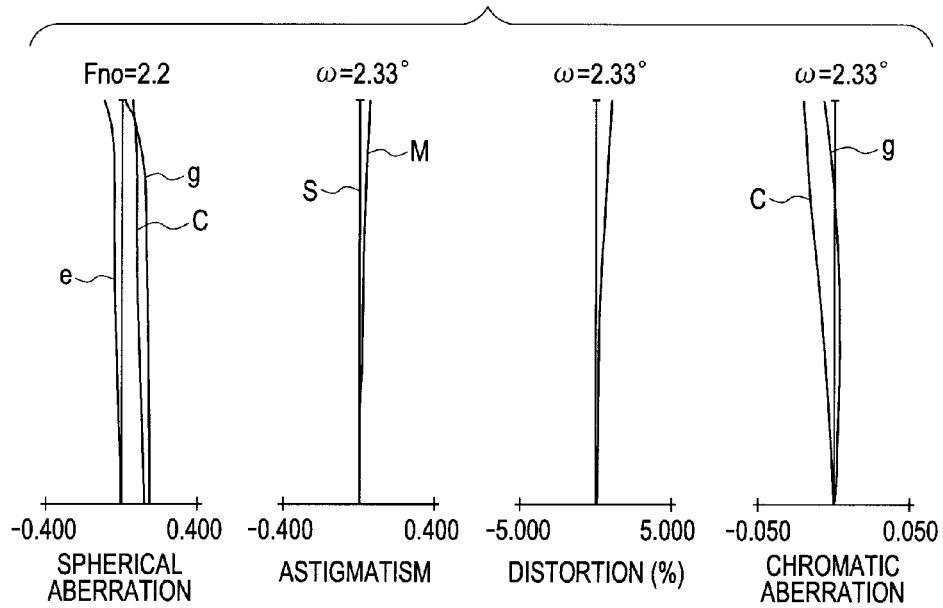
FIG. 6C is an aberration diagram of the zoom lens according to the third embodiment at the telephoto end.

FIG. 5 is a cross sectional view of a zoom lens according to numerical embodiment 3 as a third embodiment of the present invention in the state at the wide angle end. FIGS. 6A, 6B and 6C are aberration diagrams of numerical embodiment 3 respectively at the wide angle end, at a focal length f of 30.45 mm and at the telephoto end.

As shown in FIG. 5, the zoom lens according to this embodiment has a front lens unit F having a positive refractive power, which constitutes the first lens unit, a variator V having a negative refractive power for varying magnification, which constitutes the second lens unit, and a compensator C having a negative refractive power, which constitutes the third lens unit. The first lens unit F includes a sub lens unit 1a which is located closest to the object side and does not move for varying magnification or for focusing and a positive sub lens unit 1b which does not move for varying magnification but moves for focusing. The variator V moves monotonically toward the image plane side along the optical axis to vary magnification from the wide angle end to the telephoto end. The compensator C moves along the optical axis toward the object side in a nonlinear manner to correct image plane variation caused with variation of magnification. The variator V and the compensator C constitute a magnification varying system. The zoom lens according to this embodiment further includes a stop SP, a fixed (or immobile) relay lens unit R having a positive refractive power for imaging, which constitutes the fourth lens unit, a color splitting prism, and an optical filter. In FIG. 5, the color splitting prism and the optical filter are collectively illustrated as a glass block P. The image plane I is also illustrated in FIG. 5.

In the following, the first lens unit in this embodiment will be described in detail. The first lens unit includes the first to twelfth optical surfaces. The first lens unit is constituted, in order from the object side, by a negative lens, a cemented lens made up of a negative lens and a positive lens, a positive lens, a positive lens and a positive lens. The positive lens in the sub lens unit 1a constitutes the positive lens which satisfies conditional expressions (1), (2) and (3) in the first lens unit.

The values associated with the conditional expressions are presented for this embodiment in Table 1. This numerical embodiment satisfies all the conditional expressions, is small in size while having a high zoom ratio higher than 15, and has excellent optical performance with well-corrected chromatic aberration at the telephoto end.

| (Numerical Embodiment 3) | | | | | | | |
|---|---|---|---|---|---|---|---|
| SN | r | d | nd | νd | θgF | ED | FL |
| 1 | −217.44675 | 1.80000 | 1.786500 | 50.00 | 0.5514 | 81.810 | −100.728 |
| 2 | 126.02373 | 5.96050 | 1.000000 | 0.00 | 0.0000 | 79.133 | 0.000 |
| 3 | 481.11288 | 1.80000 | 1.805181 | 25.42 | 0.6161 | 79.467 | −193.220 |
| 4 | 118.18375 | 0.00000 | 1.000000 | 0.00 | 0.0000 | 79.988 | 0.000 |
| 5 | 118.18375 | 15.54046 | 1.750000 | 80.00 | 0.5350 | 79.988 | 106.807 |
| 6 | −236.77188 | 0.94773 | 1.000000 | 0.00 | 0.0000 | 80.504 | 0.000 |
| 7 | 177.35457 | 9.00662 | 1.496999 | 81.54 | 0.5374 | 79.765 | 240.003 |
| 8 | −361.35164 | 5.44946 | 1.000000 | 0.00 | 0.0000 | 79.292 | 0.000 |
| 9 | 104.06070 | 11.08892 | 1.496999 | 81.54 | 0.5374 | 75.111 | 149.245 |
| 10 | −251.67493 | 0.15000 | 1.000000 | 0.00 | 0.0000 | 74.399 | 0.000 |
| 11 | 62.53316 | 6.64154 | 1.729157 | 54.68 | 0.5444 | 66.245 | 150.339 |
| 12 | 138.24464 | (variable) | 1.000000 | 0.00 | 0.0000 | 65.403 | 0.000 |
| 13 | 140.19640 | 0.70000 | 1.882997 | 40.76 | 0.5667 | 27.590 | −1.8.157 |
| 14 | 14.42872 | 5.81456 | 1.000000 | 0.00 | 0.0000 | 21.754 | 0.000 |
| 15 | −113.57346 | 6.19262 | 1.808095 | 22.76 | 0.6307 | 21.567 | 18.838 |
| 16 | −13.87750 | 0.70000 | 1.816000 | 46.62 | 0.5568 | 21.220 | −12.447 |
| 17 | 39.48694 | 0.86113 | 1.000000 | 0.00 | 0.0000 | 19.909 | 0.000 |
| 18 | 24.50248 | 5.18350 | 1.567322 | 42.80 | 0.5730 | 20.048 | 24.401 |
| 19 | −29.75353 | 0.57401 | 1.000000 | 0.00 | 0.0000 | 19.679 | 0.000 |
| 20 | −24.11269 | 0.70000 | 1.882997 | 40.76 | 0.5667 | 19.492 | −34.401 |
| 21 | −115.95632 | (variable) | 1.000000 | 0.00 | 0.0000 | 19.485 | 0.000 |
| 22 | −26.84349 | 0.70000 | 1.743198 | 49.34 | 0.5530 | 20.731 | −22.804 |
| 23 | 47.09876 | 2.87317 | 1.846660 | 23.78 | 0.6205 | 22.827 | 51.850 |
| 24 | −733.95031 | (variable) | 1.000000 | 0.00 | 0.0000 | 23.426 | 0.000 |
| 25 | 0.00000 | 1.30000 | 1.000000 | 0.00 | 0.0000 | 25.479 | 0.000 |
| 26 | 687.58552 | 5.54551 | 1.658441 | 50.88 | 0.5561 | 26.655 | 50.753 |
| 27 | −35.18441 | 0.15000 | 1.000000 | 0.00 | 0.0000 | 27.811 | 0.000 |
| 28 | 82.70199 | 2.62194 | 1.517417 | 52.43 | 0.5564 | 28.651 | 150.888 |
| 29 | −1500.49263 | 0.15000 | 1.000000 | 0.00 | 0.0000 | 28.661 | 0.000 |
| 30 | 86.85411 | 6.20384 | 1.522494 | 59.84 | 0.5439 | 28.663 | 42.964 |
| 31 | −29.68753 | 1.80000 | 1.834807 | 42.71 | 0.5642 | 28.508 | −44.584 |
| 32 | −147.55235 | 25.00000 | 1.000000 | 0.00 | 0.0000 | 28.951 | 0.000 |
| 33 | 72.96419 | 5.29616 | 1.516330 | 64.14 | 0.5352 | 29.141 | 53.518 |
| 34 | −43.63605 | 1.02297 | 1.000000 | 0.00 | 0.0000 | 28.959 | 0.000 |

-continued

| 35 | −66.76724 | 1.80000 | 1.834807 | 42.71 | 0.5642 | 27.680 | −25.439 |
| 36 | 31.78289 | 5.96382 | 1.516330 | 64.14 | 0.5352 | 26.920 | 40.328 |
| 37 | −57.12906 | 2.99922 | 1.000000 | 0.00 | 0.0000 | 26.986 | 0.000 |
| 38 | 74.16565 | 5.82778 | 1.487490 | 70.23 | 0.5300 | 26.341 | 43.864 |
| 39 | −29.41052 | 1.80000 | 1.834070 | 37.16 | 0.5775 | 26.221 | −40.998 |
| 40 | −208.06642 | 0.27424 | 1.000000 | 0.00 | 0.0000 | 26.784 | 0.000 |
| 41 | 54.81439 | 4.45246 | 1.516330 | 64.14 | 0.5352 | 27.082 | 58.955 |
| 42 | −67.11834 | 4.50000 | 1.000000 | 0.00 | 0.0000 | 26.954 | 0.000 |
| 43 | 0.00000 | 30.00000 | 1.603420 | 38.01 | 0.5795 | 40.000 | 0.000 |
| 44 | 0.00000 | 16.20000 | 1.516330 | 64.15 | 0.5352 | 40.000 | 0.000 |
| 45 | 0.00000 | 0.00000 | 1.000000 | 0.00 | 0.0000 | 40.000 | 0.000 |

In the above table, "SN" stands for "Surface Number, "ED" stands for "Effective Diameter, and "FL" stands for focal length.

Aspheric Surface Data
13th surface

| K = 8.30817e+000 | A4 = 1.10412e−005 | A6 = −6.32164e−008 |
| A8 = 2.13591e−010 | A10 = −3.02948e−012 | A12 = 9.00926e−015 |
| A3 = −9.63886e−006 | A5 = −7.07993e−010 | A7 = 9.37484e−010 |
| A9 = 3.56559e−011 | A11 = −1.15466e−013 | |

Various Data
zoom ratio 18.00

| | wide angle | intermediate | telephoto |
|---|---|---|---|
| focal length | 7.50 | 30.45 | 135.00 |
| F-number | 1.80 | 1.80 | 2.20 |
| angle of field | 36.25 | 10.24 | 2.33 |
| image height | 5.50 | 5.50 | 5.50 |
| full lens length | 271.07 | 271.07 | 271.07 |
| BF | 8.77 | 8.77 | 8.77 |
| d12 | 0.58 | 35.82 | 50.57 |
| d21 | 53.73 | 13.63 | 4.58 |
| d24 | 2.40 | 7.75 | 1.54 |
| d45 | 8.77 | 8.77 | 8.77 |
| entrance P | 48.66 | 169.08 | 513.91 |
| exit p | 1214.65 | 1214.65 | 1214.65 |
| front pp | 56.20 | 200.30 | 664.02 |
| rear pp | 1.27 | −21.68 | −126.23 |

Zoom Lens Unit Data

| unit | FS | FL | LUL | front pp | rear pp |
|---|---|---|---|---|---|
| 1 | 1 | 65.60 | 58.39 | 35.69 | 2.87 |
| 2 | 13 | −12.88 | 20.73 | 2.27 | −11.46 |
| 3 | 22 | −41.20 | 3.57 | −0.13 | −2.09 |
| 4 | 25 | 46.57 | 122.91 | 48.28 | −102.51 |

Fourth Embodiment

Figure 7:
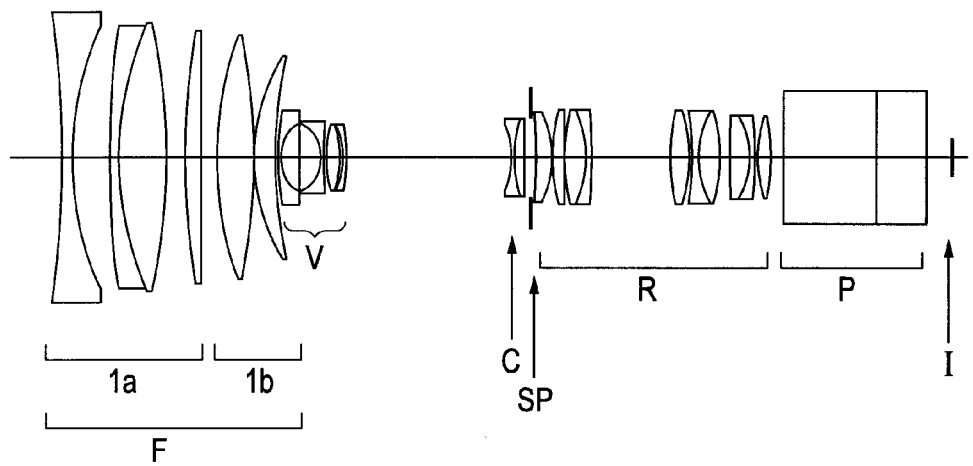
FIG. 7 is a cross sectional view of a zoom lens according to a fourth embodiment in the state at the wide angle end.
Figure 8A:
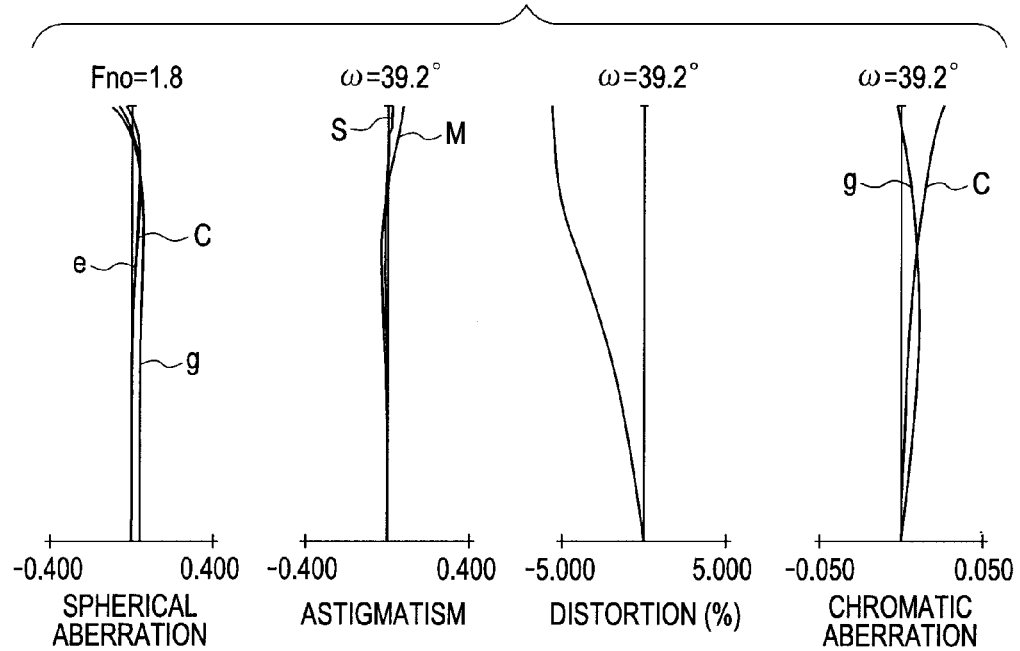
FIG. 8A is an aberration diagram of the zoom lens according to the fourth embodiment at the wide angle end.
Figure 8B:
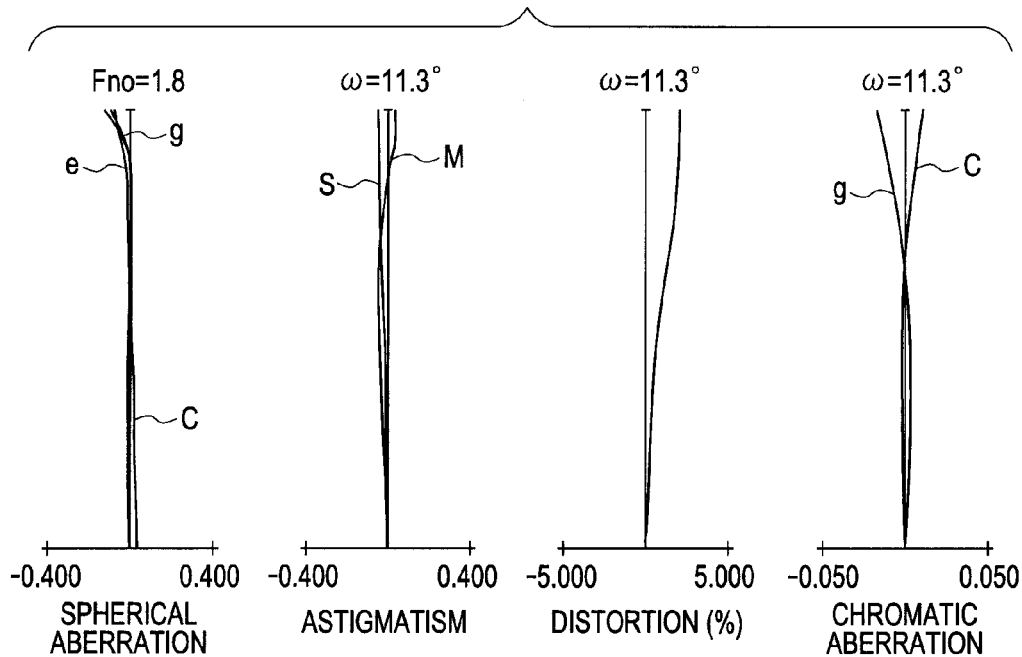
FIG. 8B is an aberration diagram of the zoom lens according to the fourth embodiment at a focal length f of 27.41 mm.
Figure 8C:
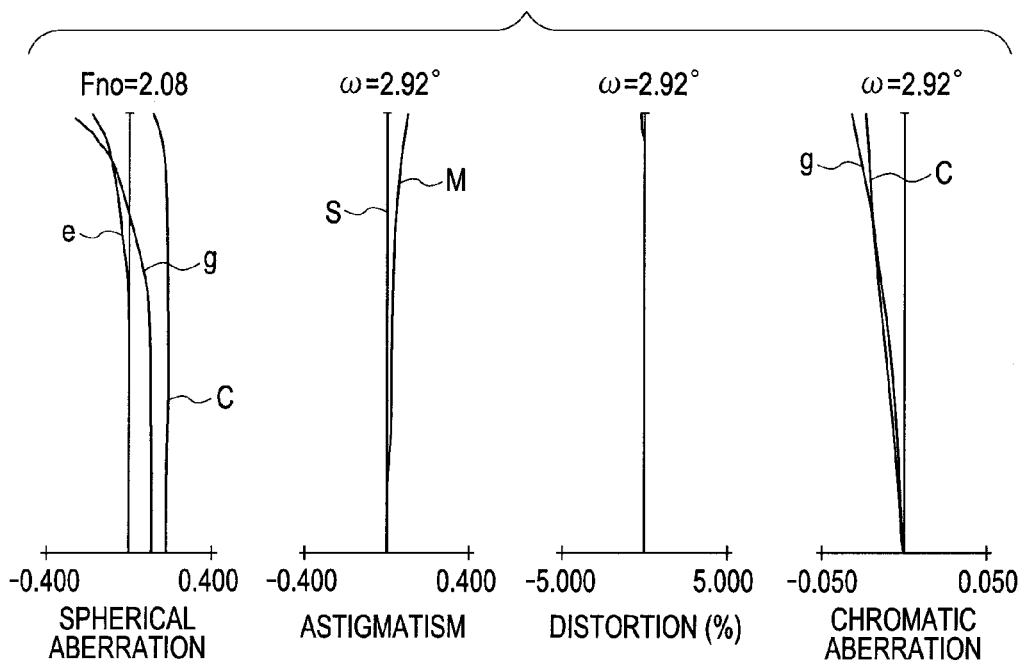
FIG. 8C is an aberration diagram of the zoom lens according to the fourth embodiment at the telephoto end.

FIG. 7 is a cross sectional view of a zoom lens according to numerical embodiment 4 as a fourth embodiment of the present invention in the state at the wide angle end. FIGS. 8A, 8B and 8C are aberration diagrams of numerical embodiment 4 respectively at the wide angle end, at a focal length f of 27.41 mm and at the telephoto end.

As shown in FIG. 7, the zoom lens according to this embodiment has a front lens unit F having a positive refractive power, which constitutes the first lens unit, a variator V having a negative refractive power for varying magnification, which constitutes the second lens unit, and a compensator C having a negative refractive power, which constitutes the third lens unit. The first lens unit F includes a sub lens unit 1a which is located closest to the object side and does not move for varying magnification or for focusing and a positive sub lens unit 1b which does not move for varying magnification but moves for focusing. The variator V moves monotonically toward the image plane side along the optical axis to vary magnification from the wide angle end to the telephoto end. The compensator C moves along the optical axis toward the object side in a nonlinear manner to correct image plane variation caused with variation of magnification. The variator V and the compensator C constitute a magnification varying system. The zoom lens according to this embodiment further includes a stop SP, a fixed (or immobile) relay lens unit R having a positive refractive power for imaging, which constitutes the fourth lens unit, a color splitting prism, and an optical filter. In FIG. 7, the color splitting prism and the optical filter are collectively illustrated as a glass block P. The image plane I is also illustrated in FIG. 7.

In the following, the first lens unit in this embodiment will be described in detail. The first lens unit includes the first to twelfth optical surfaces. The first lens unit is constituted, in order from the object side, by a negative lens, a cemented lens made up of a negative lens and a positive lens, a positive lens, a positive lens and a positive lens. The positive lens in the sub lens unit 1a constitutes the positive lens which satisfies conditional expressions (1), (2) and (3) in the first lens unit.

The values associated with the conditional expressions are presented for this embodiment in Table 1. This numerical embodiment satisfies all the conditional expressions, is small in size while having a high zoom ratio higher than 15, and has excellent optical performance with well-corrected chromatic aberration at the telephoto end.

(Numerical Embodiment 4)

| SN | r | d | nd | νd | θgF | ED | FL |
|---|---|---|---|---|---|---|---|
| 1 | −305.80227 | 3.00000 | 1.834000 | 37.16 | 0.5775 | 88.941 | −87.707 |
| 2 | 97.38724 | 12.14272 | 1.000000 | 0.00 | 0.0000 | 80.932 | 0.000 |
| 3 | 303.55135 | 3.00000 | 1.805181 | 25.42 | 0.6161 | 80.297 | −201.729 |
| 4 | 105.97483 | 0.00000 | 1.000000 | 0.00 | 0.0000 | 80.783 | 0.000 |
| 5 | 105.97483 | 14.98271 | 1.768230 | 72.21 | 0.5289 | 80.783 | 92.429 |
| 6 | −203.99407 | 6.04162 | 1.000000 | 0.00 | 0.0000 | 81.016 | 0.000 |
| 7 | 243.41972 | 4.93805 | 1.487490 | 70.23 | 0.5300 | 78.713 | 469.083 |
| 8 | −3971.64714 | 4.90452 | 1.000000 | 0.00 | 0.0000 | 78.368 | 0.000 |
| 9 | 106.09071 | 12.27443 | 1.487490 | 70.23 | 0.5300 | 75.589 | 140.47 |
| 10 | −187.61375 | 0.13500 | 1.000000 | 0.00 | 0.0000 | 74.850 | 0.000 |
| 11 | 60.87268 | 6.86142 | 1.729157 | 54.68 | 0.5444 | 62.517 | 133.922 |
| 12 | 152.82683 | (variable) | 1.000000 | 0.00 | 0.0000 | 61.331 | 0.000 |
| 13 | 144.04329 | 0.70000 | 1.882997 | 40.76 | 0.5667 | 28.449 | −16.833 |
| 14 | 13.51307 | 6.02729 | 1.000000 | 0.00 | 0.0000 | 21.639 | 0.000 |
| 15 | −187.50562 | 7.14242 | 1.808095 | 22.76 | 0.6307 | 21.443 | 15.607 |
| 16 | −12.13544 | 0.70000 | 1.882997 | 40.76 | 0.5667 | 21.050 | −11.819 |
| 17 | 79.84813 | 0.40813 | 1.000000 | 0.00 | 0.0000 | 20.196 | 0.000 |
| 18 | 26.33299 | 5.02011 | 1.567322 | 42.80 | 0.5730 | 20.212 | 25.716 |
| 19 | −30.82814 | 1.01102 | 1.000000 | 0.00 | 0.0000 | 19.814 | 0.000 |
| 20 | −24.24172 | 0.70000 | 1.882997 | 40.76 | 0.5667 | 19.129 | −33.986 |
| 21 | −124.80410 | (variable) | 1.000000 | 0.00 | 0.0000 | 19.073 | 0.000 |
| 22 | −26.83081 | 0.70000 | 1.743198 | 49.34 | 0.5530 | 20.302 | −22.788 |
| 23 | 47.05009 | 3.54134 | 1.846660 | 23.78 | 0.6205 | 22.277 | 51.820 |
| 24 | −733.95031 | (variable) | 1.000000 | 0.00 | 0.0000 | 23.179 | 0.000 |
| 25 | 0.00000 | 1.30000 | 1.000000 | 0.00 | 0.0000 | 24.938 | 0.000 |
| 26 | −128.80950 | 4.94607 | 1.658441 | 50.88 | 0.5561 | 25.476 | 67.334 |
| 27 | −33.60356 | 0.15000 | 1.000000 | 0.00 | 0.0000 | 26.986 | 0.000 |
| 28 | 56.58635 | 3.94962 | 1.517417 | 52.43 | 0.5564 | 28.645 | 100.917 |
| 29 | −701.01436 | 0.15000 | 1.000000 | 0.00 | 0.0000 | 28.723 | 0.000 |
| 30 | 74.24770 | 6.46465 | 1.522494 | 59.84 | 0.5439 | 28.788 | 46.671 |
| 31 | −35.43199 | 1.80000 | 1.834807 | 42.71 | 0.5642 | 28.562 | −51.129 |
| 32 | −207.78917 | 25.00000 | 1.000000 | 0.00 | 0.0000 | 28.822 | 0.000 |
| 33 | 55.51415 | 6.23288 | 1.517417 | 52.43 | 0.5564 | 28.662 | 48.203 |
| 34 | −43.90878 | 1.02297 | 1.000000 | 0.00 | 0.0000 | 28.289 | 0.000 |
| 35 | −62.45415 | 1.80000 | 1.834807 | 42.71 | 0.5642 | 26.946 | −22.517 |
| 36 | 27.46229 | 7.23161 | 1.516330 | 64.14 | 0.5352 | 25.968 | 33.514 |
| 37 | −43.00893 | 2.99922 | 1.000000 | 0.00 | 0.0000 | 26.052 | 0.000 |
| 38 | −1652.06674 | 6.61959 | 1.487490 | 70.23 | 0.5300 | 24.697 | 46.072 |
| 39 | −22.26190 | 1.80000 | 1.834000 | 37.16 | 0.5775 | 24.147 | −34.445 |
| 40 | −100.37715 | 0.27424 | 1.000000 | 0.00 | 0.0000 | 24.632 | 0.000 |
| 41 | 35.69607 | 4.61833 | 1.487490 | 70.23 | 0.5300 | 24.589 | 48.353 |
| 42 | −67.11834 | 4.50000 | 1.000000 | 0.00 | 0.0000 | 24.262 | 0.000 |
| 43 | 0.00000 | 30.00000 | 1.603420 | 38.01 | 0.5795 | 40.000 | 0.000 |
| 44 | 0.00000 | 16.20000 | 1.516330 | 64.15 | 0.5352 | 40.000 | 0.000 |
| 45 | 0.00000 | 0.00000 | 1.000000 | 0.00 | 0.0000 | 40.000 | 0.000 |

In the above table, "SN" stands for "Surface Number, "ED" stands for "Effective Diameter, and "FL" stands for focal length.

Aspheric Surface Data
13th surface

| K = −9.69484e+001 | A4 = 2.46569e−005 | A6 = −7.14936e−008 |
|---|---|---|
| A8 = 3.51212e−010 | A10 = −2.49953e−012 | A12 = 9.23189e−015 |
| A3 = −1.04326e−005 | A5 = 2.14291e−007 | A7 = −2.42573e−009 |
| A9 = 3.39200e−011 | A11 = −1.38138e−013 | |

Various Data
zoom ratio 16.00

| | wide angle | intermediate | telephoto |
|---|---|---|---|
| focal length | 6.75 | 27.41 | 108.00 |
| F-number | 1.80 | 1.80 | 2.08 |
| angle of field | 39.17 | 11.35 | 2.92 |
| image height | 5.50 | 5.50 | 5.50 |
| full lens length | 284.87 | 284.87 | 284.87 |
| BF | 7.90 | 7.90 | 7.90 |
| d12 | 0.60 | 34.88 | 49.15 |
| d21 | 52.98 | 13.49 | 4.30 |
| d24 | 2.10 | 7.32 | 2.23 |
| d45 | 7.90 | 7.90 | 7.90 |
| entrance P | 49.70 | 149.70 | 405.44 |
| exit p | 432.76 | 432.76 | 432.76 |
| front pp | 56.55 | 178.87 | 540.89 |
| rear pp | 1.15 | −19.51 | −100.10 |

-continued

Zoom Lens Unit Data

| unit | FS | FL | LUL | front pp | rear pp |
|---|---|---|---|---|---|
| 1 | 1 | 59.04 | 68.28 | 44.01 | 8.44 |
| 2 | 13 | −12.88 | 21.71 | 2.17 | −11.80 |
| 3 | 22 | −41.20 | 4.24 | −0.15 | −2.47 |
| 4 | 25 | 50.32 | 127.06 | 55.46 | −110.92 |

In the foregoing, zoom lenses including a first lens unit having a positive refractive power, a second lens unit having a negative refractive power, a third lens unit having a negative refractive power and a fourth lens unit having a positive refractive power have been described. However, the zoom lenses to which the present invention can be applied are not limited to the above-described type of zoom lenses. The present invention can also be applied, for example, to four-unit zoom lenses having a positive-negative-positive-positive power arrangement in order from the object side, and five-unit zoom lenses having a positive-negative-positive-negative-positive, positive-negative-positive-positive-positive, positive-negative-negative-negative-positive, or positive-negative-positive-positive power arrangement in order from the object side.

TABLE 1

Values Associated With Conditional Expressions In Numerical Embodiments 1 to 4

| Conditional expression | Term | Numeral embodiment 1 | Numeral embodiment 2 | Numeral embodiment 3 | Numeral embodiment 4 |
|---|---|---|---|---|---|
| (1) | νp | 80.00 | 80.00 | 80.00 | 72.21 |
| (2) | Np + 0.01 × νp | 2.55 | 2.55 | 2.55 | 2.49 |
| (3) | Np | 1.75 | 1.75 | 1.75 | 1.77 |
| (4) | \|fp/fna\| | 1.66 | 1.33 | 1.61 | 1.51 |
| (13) | ftele/f1 | 2.31 | 2.62 | 2.06 | 1.83 |
| (14) | ftele/fp | 1.00 | 1.21 | 1.26 | 1.17 |
| (15) | (θp − θna)/(νp − νna) | −0.00129 | −0.00138 | −0.00115 | −0.00166 |
| (16) | νp − νna | 49.63 | 52.45 | 42.29 | 40.92 |
| (17) | fwide/IS | 0.75 | 0.73 | 0.68 | 0.61 |
| (18) | ftele/fwide | 20.00 | 23.00 | 18.00 | 16.00 |
| (19) | f3/f1 | −0.59 | −0.60 | −0.64 | −0.71 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-044832, filed Mar. 2, 2011, which is hereby incorporated by reference herein in its entirety.

What is claimed is:

1. A zoom lens comprising, in order from the object side, a first lens unit having a positive refractive power which does not move for varying magnification, a second lens unit having a negative refractive power which moves for varying magnification, a third lens unit having a negative refractive power which moves for varying magnification, and a fourth lens unit having a positive refractive power which does not move for varying magnification, wherein the first lens unit includes a positive lens which satisfies the following conditions:

$70 < \nu p < 85$, $2.31 < Np + 0.01 \times \nu p < 2.58$, and $1.6 < Np < 1.85$, where Np is a refractive index of the positive lens, and νp is an Abbe constant of the positive lens, and wherein the following condition is satisfied:

$1.25 < |fp/fna| < 1.7$, where fp is a focal length of the positive lens, wherein the first lens unit includes a plurality of negative lenses and fna is a combined focal length of negative lenses in the first lens unit defined by the following equation:

$$fna = \frac{1}{\sum_{i=1}^{n} \frac{1}{fn_i}}$$

where n is a number of the negative lenses included in the first lens unit, and fni is a focal length of the i-th negative lens.

2. A zoom lens according to claim 1, wherein the following conditions are satisfied:

$1.8 < ftele/f1 < 2.7$, and $0.9 < ftele/fp < 1.3$, where f1 is a focal length of the first lens unit, and ftele is a focal length of the zoom lens at the telephoto end.

3. A zoom lens according to claim 1, wherein the following conditions are satisfied:

$-1.7 \times 10^{-3} < (\theta p - \theta na)/(\nu p - \nu na) < -1.0 \times 10^{-3}$, and $40 < \nu p - \nu na < 55$, where θp is a partial dispersion ratio of the positive lens included in the first lens unit, νna is an average of Abbe constants of negative lenses included in the first lens unit, and θna is an average of partial dispersion ratios of the negative lenses included in the first lens unit, where the partial dispersion ratio θ is defined by the following equation:

$\theta = (Ng - NF)/(NF - NC)$, where Ng is a refractive index with respect of g-line, NF is a refractive index with respect to F-line, and NC is the refractive index with respect to the C-line.

4. A zoom lens according to claim 1, wherein the first lens unit comprises a first sub lens unit which is fixed and a second sub lens unit having a positive refractive power which moves for focusing, and the first sub lens unit comprises two or more negative lenses and one or more positive lenses.

5. A zoom lens according to claim 1, wherein the following condition is satisfied:

$$0.6 < fwide/IS < 0.8,$$

where fwide is a focal length of the zoom lens at the wide angle end, and IS is a diagonal length of image size.

6. A zoom lens according to claim 1, wherein the following condition is satisfied:

$$15 < ftele/fwide,$$

where ftele is a focal length of the zoom lens at the telephoto end, and fwide is a focal length of the zoom lens at the wide angle end.

7. A zoom lens according to claim 1, wherein the first lens unit includes a plurality of said positive lenses.

8. A zoom lens according to claim 1, wherein the following conditional expression is satisfied, $$-0.8 < f3/f1 < -0.5,$$

where f1 represents a focal length of the first lens unit and f3 represents a focal length of the third lens unit.

9. An image pickup apparatus comprising a zoom lens according to claim 1.

* * * * *